United States Patent
Du et al.

(10) Patent No.: US 12,136,776 B2
(45) Date of Patent: Nov. 5, 2024

(54) MINIATURIZED SELF-OSCILLATING ACTIVE INTEGRATED ANTENNA SYSTEM

(71) Applicant: GUANGDONG UNIVERSITY OF TECHNOLOGY, Guangzhou (CN)

(72) Inventors: Zhixia Du, Guangzhou (CN); Manman Cui, Guangzhou (CN); Chunbing Guo, Guangzhou (CN); Guohao Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/677,736

(22) Filed: May 29, 2024

(65) Prior Publication Data
US 2024/0313409 A1    Sep. 19, 2024

Related U.S. Application Data

(63) Continuation of application No. PCT/CN2023/125417, filed on Oct. 19, 2023.

(30) Foreign Application Priority Data

Dec. 27, 2022   (CN) .......................... 202211679651.9

(51) Int. Cl.
*H01Q 9/30*     (2006.01)
*H01Q 1/22*     (2006.01)
*H01Q 3/24*     (2006.01)

(52) U.S. Cl.
CPC ............. *H01Q 9/30* (2013.01); *H01Q 1/2283* (2013.01); *H01Q 3/24* (2013.01)

(58) Field of Classification Search
CPC ........ H01Q 1/22–24; H01Q 1/38; H01Q 3/24; H01Q 9/30
See application file for complete search history.

(56) References Cited

U.S. PATENT DOCUMENTS 5,990,838 A * 11/1999 Burns .................... H01Q 21/29
343/702

OTHER PUBLICATIONS

Du Zhixia, "Research on High Performance Microwave Sources and Rectifier Antennas for Microwave Energy Transmission", China Doctoral Dissertation Full text Database (Electronic Journal) Engineering Science and Technology II, Jan. 15, 2020, Section 2.2, Figures 2.2, 2.3, 2.7, 2.8.

(Continued)

*Primary Examiner* — Hasan Islam
(74) *Attorney, Agent, or Firm* — Hemisphere Law, PLLC; Zhigang Ma

(57) ABSTRACT

Disclosed in the present disclosure is a miniaturized self-oscillating active integrated antenna system. The system includes at least one antenna array unit, and the antenna array unit includes an initial unit and multiple amplifying units which are stimulated to emit. The initial unit includes a first dielectric substrate and a first surface structure, the first surface structure is connected to a surface of the first dielectric substrate, and the first surface structure includes a first boat-shaped monopole antenna, a first switching transistor, a base bias network and a first direct current bias network. The amplifying unit includes a second dielectric substrate and a second surface structure, and the second surface structure is connected to a surface of the second dielectric substrate. The second surface structure includes a second boat-shaped monopole antenna, a second switching transistor, a first resistor and a second direct current bias network.

8 Claims, 6 Drawing Sheets

(56) References Cited

OTHER PUBLICATIONS

Claims of PCT/CN2023/125417.
CNIPA (ISA), Written Opinion from an International Searching Authority for PCT/CN2023/125417, Dec. 19, 2023.

* cited by examiner

MINIATURIZED SELF-OSCILLATING ACTIVE INTEGRATED ANTENNA SYSTEM

TECHNICAL FIELD

The present disclosure relates to the field of antenna systems, and in particular to a miniaturized self-oscillating active integrated antenna system.

BACKGROUND

A self-oscillating active integrated antenna is a kind of device which can directly radiate direct current power oscillation into space, and is widely used in wireless energy transmission, radar and other applications. The self-oscillating active antenna is generally composed of oscillators and radiators, and the radiators include microstrip patch antennas, loop antennas, dipole antennas, metamaterial resonators, etc.

The intensity of radiation waves of a conventional self-oscillating active integrated antenna is positively correlated with a bias voltage, and therefore, the power of an emitted electromagnetic wave is limited by a withstand voltage value of a switching device and bias voltage supply. A multi-order active integrated antenna technology with scalable power is proposed in recent research, which reduces dependence of output power on a direct current bias voltage. However, this solution employs conventional dipole antenna array design, which has a relatively large size.

SUMMARY

In order to solve the above technical problems, an objective of the present disclosure is to provide a miniaturized self-oscillating active integrated antenna system. The coherent stimulated emission theory is introduced into the design of the self-oscillating active integrated antenna system to realize coherent superposition of multi-unit radiation waves, such that output power of the system is scalable, and dependence of the output power on a bias voltage and a withstand voltage of a switching device is overcome. Moreover, the coherent stimulated emission theory is combined with a planar boat-shaped monopole antenna array, and compactness and miniaturization of the system are realized by overcoming the influence of a coupling effect caused by reduction of spacing between units.

The technical solutions employed by the present disclosure are as follows: a miniaturized self-oscillating active integrated antenna system includes at least one antenna array unit, and the antenna array unit includes an initial unit and multiple amplifying units which are stimulated to emit.

The initial unit includes a first dielectric substrate and a first surface structure, the first surface structure is connected to a surface of the first dielectric substrate, and the first surface structure includes a first boat-shaped monopole antenna, a first switching transistor, a base bias network and a first direct current bias network. A collector of the first switching transistor is connected to the first boat-shaped monopole antenna, and an emitter of the first switching transistor is grounded. A base of the first switching transistor is connected to the base bias network, and the first direct current bias network is connected to the first boat-shaped monopole antenna.

The amplifying unit includes a second dielectric substrate and a second surface structure, the second surface structure is connected to a surface of the second dielectric substrate, and the second surface structure includes a second boat-shaped monopole antenna, a second switching transistor, a first resistor and a second direct current bias network. A collector of the second switching transistor is connected to the second boat-shaped monopole antenna, and an emitter of the second switching transistor is connected to a ground. A base of the second switching transistor is connected to the first resistor, a second terminal of the first resistor is connected to a ground phase of the second boat-shaped monopole antenna, and the second direct current bias network is connected to the second boat-shaped monopole antenna.

Further, the base bias network includes a second resistor. A first capacitor and a third resistor, a first terminal of the second resistor is connected to a first terminal of the first capacitor, a second terminal of the first capacitor and a first terminal of the third resistor are connected to the base of the first switching transistor, and a second terminal of the second resistor and a second terminal of the third resistor are connected to a ground phase of the first boat-shaped monopole antenna.

Further, the first direct current bias network includes a first direct current voltage source and a fourth resistor, the first direct current voltage source is connected to a first terminal of the fourth resistor, and a second terminal of the fourth resistor is connected to an arm of the first boat-shaped monopole antenna.

Further, the first switching transistor includes but not limited to an avalanche transistor, and the second switching transistor includes but not limited to an avalanche transistor.

Further, the first switching transistor is used for receiving a control signal and control connection and disconnection of the arm and the ground of the first boat-shaped monopole antenna, and the first direct current bias network is used for charging the first boat-shaped monopole antenna when the collector and the emitter of the first switching transistor are disconnected.

Further, a working process of the initial unit is as follows:

In an initial state, the collector and the emitter of the first switching transistor are disconnected. The first boat-shaped monopole antenna is charged to a high voltage via the first direct current bias network, and the first switching transistor is biased to a critical breakdown state.

When the control signal becomes high level and triggers the first switching transistor to connect the collector and the emitter via the base bias network, charges between the arm and the ground of the first boat-shaped monopole antenna oscillate at the resonate frequency of the antenna to form an oscillating current and radiate an electromagnetic wave to the outside.

In a radiation process, a potential difference between the arm and the ground of the first boat-shaped monopole antenna is decreased gradually, and an output voltage shows an attenuation trend.

When the control signal becomes low level and enables the first switching transistor to disconnect the collector and the emitter, the first boat-shaped monopole antenna enters a charging state and waits for a next trigger by the control signal to enter a next work period.

Further, if the first direct current voltage source is increased to be greater than the breakdown voltage of the first switching transistor, periodic connection and disconnection of the first switching transistor will be realized, the oscillating current is periodically generated, and the electromagnetic wave is emitted.

Further, a working process of the amplifying unit is as follows:

In an initial state, the collector and the emitter of the second switching transistor are disconnected, the second boat-shaped monopole antenna is charged to a high voltage via the second direct current bias network, and the second switching transistor is biased to a critical breakdown state.

The electromagnetic wave radiated by the initial unit is received, and potential on the arm of the second boat-shaped monopole antenna is increased. The second switching transistor is break down and is in a short circuit, and the second boat-shaped monopole antenna is triggered to generate an oscillating current and emit an electromagnetic wave with the same phase as the incident wave.

In-phase superposition of the two radiation waves is realized, such that coherent stimulated emission is realized, and the radiation waves are continued to be radiated to a latter amplifying unit.

The system provided by the present disclosure has the beneficial effects as follows: in the present disclosure, the structure of the amplifying unit is proposed and introduced into the self-oscillating active integrated antenna system, and since the structure has the superior characteristic of effectively overcoming the phase difference of radiation waves of multiple units, in-phase superposition of radiation waves of various units can be realized. Moreover, each unit in the self-oscillating active integrated antenna system provided by the present patent has physical independence, the number of amplifying units can be increased or decreased according to requirements, and the self-oscillating active integrated antenna system has an extremely high array scalable property and output power promotion freedom, thereby solving the problem that output power depends on the direct current bias voltage in the prior art of self-oscillating active antennas. The coherent stimulated emission theory is realized on a monopole antenna array for the first time, the coupling effect between units is reduced by means of the boat-shaped structure design, and the unit spacing is effectively reduced by using a method in which influence of a coupling voltage on radiation characteristics is overcome by means of bias voltage control, which is peculiar to such a structure, thereby realizing the miniaturized self-oscillating active integrated antenna system.

Numerals in figures: 10, first boat-shaped monopole antenna; 11, first switching transistor; $R_3$, first resistor; $R_{B1}$, second resistor; $C_{Block}$, first capacitor; $R_{B2}$, third resistor; $V_{DC1}$, first direct current voltage source; $R_{C1}$, fourth resistor; 20, second boat-shaped monopole antenna; 21, second switching transistor; $V_{DC2}$, second direct current voltage source; $R_{C2}$, fifth resistor; 12, first connecting line; 13, second connecting line; 14, third connecting line; 23, fourth connecting line; and 24, fifth connecting line.

DETAILED DESCRIPTION OF THE EMBODIMENTS

The present disclosure will be further described in detail below with reference to accompanying drawings and in conjunction with particular examples. The step numbers in the following examples are set for convenience of explanation only, and the order of the steps is not limited. The execution order of each step in the examples may be adaptively adjusted according to the understanding of those skilled in the art.

Figure 1A:
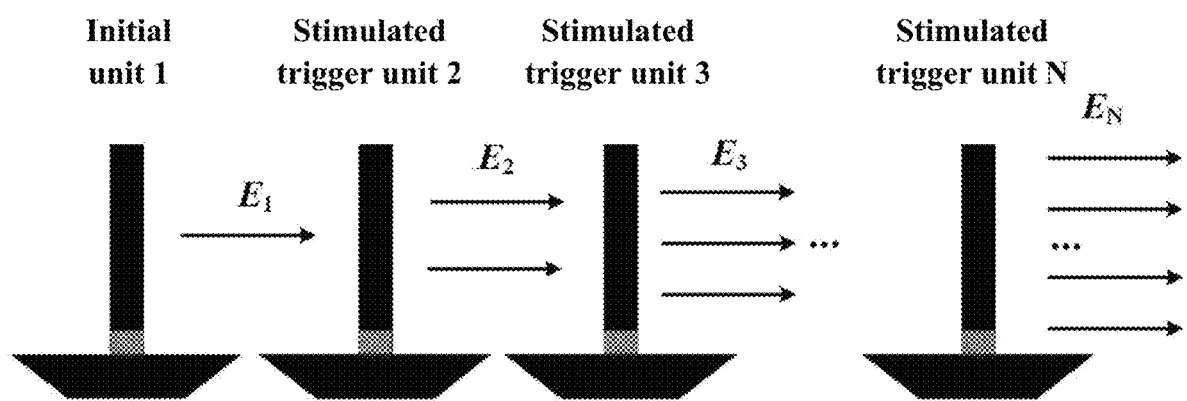
FIG. 1A is a schematic diagram of a miniaturized self-oscillating active integrated antenna system of the present disclosure.
Figure 1B:
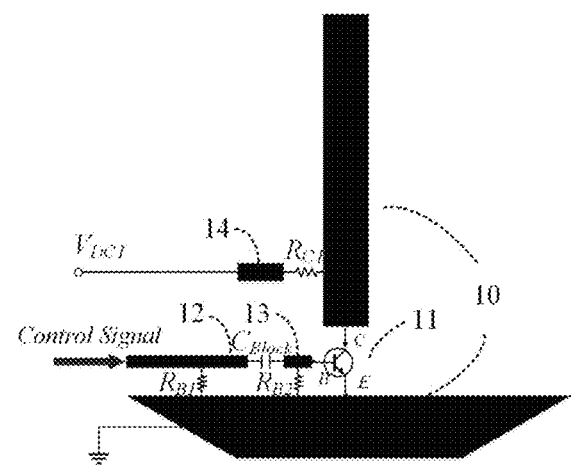
FIG. 1B is a schematic structural diagram of an initial unit in a miniaturized self-oscillating active integrated antenna system of the present disclosure.
Figure 1C:
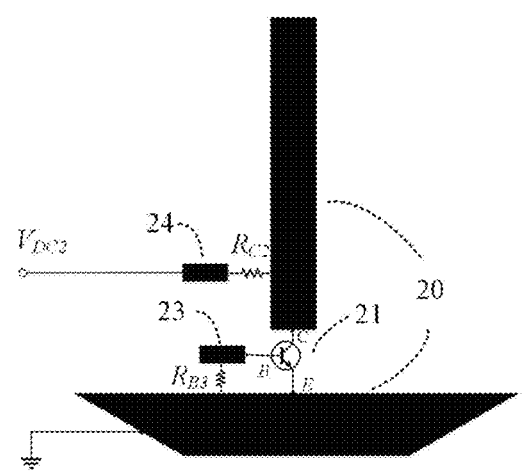
FIG. 1C is a schematic structural diagram of an amplifying unit which is stimulated to emit in a miniaturized self-oscillating active integrated antenna system of the present disclosure.

As shown in FIG. 1A, FIG. 1B and FIG. 1C, a miniaturized self-oscillating active integrated antenna system is provided in the present disclosure. The system includes at least one antenna array unit, and the antenna array unit includes an initial unit 1 and N stimulated trigger units.

The initial unit 1 includes a first dielectric substrate and a first surface structure, and the first surface structure is of a metal antenna structure and an active circuit on a surface of the first dielectric substrate. The first surface structure includes a first boat-shaped monopole antenna 10 serving as a radiator, a first switching transistor 11, a base bias network and a first direct current bias network. The first boat-shaped monopole antenna 10 is a planar monopole antenna, and a coupling effect between the first boat-shaped monopole antenna and an amplifying unit 2 which is stimulated to emit is reduced by a metal ground cut angle, which is conductive to realization of a more compact unit spacing so as to reduce the system size. A collector C and an emitter E of the first switching transistor 11 are connected to an arm and a ground of the first boat-shaped monopole antenna 10 respectively for controlling connection and disconnection of the arm and the ground of the antenna. A base B of the first switching transistor 11 is connected to the base bias network for receiving a control signal, and the base bias network is composed of a first connecting line 12, a second resistor $R_{B1}$, a first capacitor $C_{Block}$, a third resistor $R_{B2}$ and a second connecting line 13. The direct current bias network is composed of a first direct current voltage source $V_{DC1}$, a third connecting line 14 and a fourth resistor $R_{C1}$, and is connected to the collector C of the first switching transistor 11 via the arm of the first boat-shaped monopole antenna 10 for charging the first boat-shaped monopole antenna 10 when the collector C and the emitter E of the first switching transistor 11 are disconnected.

The frequency of an electromagnetic wave radiated outwards by the initial unit 1 is determined by the first boat-shaped monopole antenna 10, and the electromagnetic wave power of the single unit is determined by the first direct current voltage source $V_{DC1}$. The first switching transistor 11 includes but not limited to an avalanche transistor working in a breakdown state.

The amplifying unit includes a second dielectric substrate and a second surface structure, and the second surface structure is of a metal antenna structure and an active circuit on a surface of the second dielectric substrate. The second surface structure includes a second boat-shaped monopole antenna 20 serving as a radiator, a second switching transistor 21, a first resistor $R_{B3}$ and a second direct current bias network. The second boat-shaped monopole antenna 20 is a planar monopole antenna, and a coupling effect between other units is reduced by means of a metal ground cut angle, thereby realizing a more compact system structure. A collector C and an emitter E of the second switching transistor 21 are connected to an arm and a ground of the second boat-shaped monopole antenna 20 respectively, and incident electromagnetic waves are received by the second boat-shaped monopole antenna 20, such that a potential difference on the collector C and the emitter E is influenced, thereby controlling connection and disconnection. A base B of the second switching transistor 21 is grounded via a fourth connecting line 23 and the first resistor $R_{B3}$ to prevent energy loss caused by the fact that a current flows through the base B. The second direct current bias network is composed of a second direct current voltage source $V_{DC2}$, a fifth connecting line 24 and a fifth resistor $R_{C2}$, and is connected to the collector C of the second switching transistor 21 via the arm of the second boat-shaped monopole antenna 20 for charging the second boat-shaped monopole antenna 20 when the collector C and the emitter E of the second switching transistor 21 are disconnected.

The frequency of an electromagnetic wave radiated by the amplifying unit 2 is determined by the boat-shaped monopole antenna, and the electromagnetic wave power of the single unit is determined by the direct current voltage source. The transistor includes but not limited to an avalanche transistor. The structure of the amplifying unit N is the same as that of the amplifying unit 2, and each unit has physical independence, such that the number of units can be increased according to needs during application, and the output power of the system can be greatly improved, thereby achieving a quite strong scalable property. The stimulated trigger units 2, 3, . . . , N have identical structures and working mechanisms.

The radiators include but not limited to the planar boat-shaped monopole antennas 10 and 20 and also include other monopole antenna configurations.

In addition, a working process of the initial unit 1 is as follows: in an initial state, the collector C and the emitter E of the first switching transistor 11 are disconnected, the first boat-shaped monopole antenna 10 is charged to a high voltage via the first direct current bias network, and the first switching transistor 11 is biased to a critical breakdown state. When the control signal becomes high level and triggers the first switching transistor 11 to connect the collector C and emitter E via the base bias network, charges between the arm and the ground of the first boat-shaped monopole antenna 10 oscillate at the resonate frequency of the antenna to form an oscillating current and radiate an electromagnetic wave to the outside. In a radiation process, a potential difference between the arm and the ground of the first boat-shaped monopole antenna 10 is decreased gradually, and an output voltage shows an attenuation trend. When the control signal becomes low level and enables the first switching transistor 11 to disconnect the collector C and the emitter E, the first boat-shaped monopole antenna 10 enters a charging state again and waits for a next trigger by the control signal to enter a next work period.

In addition, the control signal is not indispensable, and periodic connection and disconnection of the first switching transistor 11 can likewise be achieved by raising the first direct current voltage source $V_{DC1}$ above the breakdown voltage of the first switching transistor 11, thereby periodically generating an oscillating current and emitting an electromagnetic wave. A working process of the amplifying unit 2 is as follows: in an initial state, the collector C and the emitter E of the second switching transistor 21 are disconnected, the second boat-shaped monopole antenna 20 is charged to a high voltage via the second direct current bias network, and the second switching transistor 21 is biased to a critical breakdown state. The electromagnetic wave radiated by the initial unit 1 will be emitted into the amplifying unit 2, which causes an increase of potential on the arm of the second boat-shaped monopole antenna 20, such that the second switching transistor 21 is break down and is in a short circuit, and the second boat-shaped monopole antenna 20 is triggered to generate an oscillating current and emit an electromagnetic wave with the same phase as the incident wave. In-phase superposition of the two radiation waves is realized, such that coherent stimulated emission is realized, and the radiation waves are continued to be radiated to a latter stimulated trigger unit. In this way, the power of the radiation wave is snowballed continuously, and the self-oscillating active integrated antenna system with scalable power is realized.

The output power of the self-oscillating active integrated antenna system is jointly determined by the bias voltage and the number of units of the active antenna array. The present disclosure has a compact system structure, coupling generated by too small system unit spacings can be reduced by means of the boat-shaped structure design, and influence of the coupling voltage can be overcome by means of control over the direct current bias voltage $V_{DC}$, such that the miniaturized self-oscillating active integrated antenna system is realized.

A second-order self-oscillating active integrated antenna system is taken as an example. An FR4 dielectric substrate with a thickness of 0.8 mm, a dielectric constant of 4.4 and a loss factor of 0.02 is employed. The designed planar boat-shaped monopole antennas 10 and 20 work at 500 MHz. The direct current voltage sources $V_{DC1}$ and $V_{DC2}$ are 100 V. The series capacitor $C_{Block}$ is 51 pF. Parallel resistors $R_{B1}$, $R_{B2}$ and $R_{B3}$ are 39 Ω, 9.1 kΩ and 9.1 kΩ respectively. Series resistors $R_{C1}$ and $R_{C2}$ are both 1 MΩ.

Figure 2:
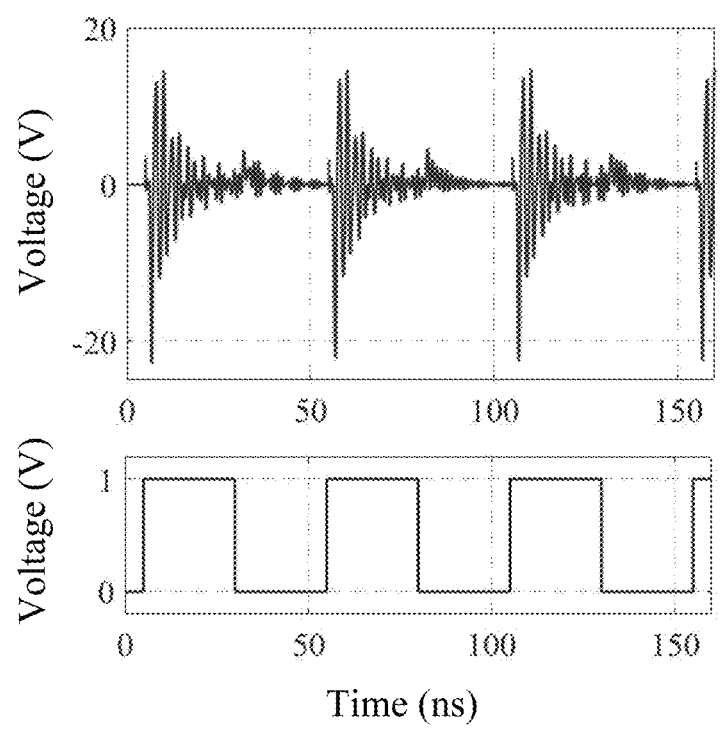
FIG. 2 is a schematic relationship diagram of a control signal and an output signal of an initial unit in a particular example of the present disclosure.

FIG. 2 shows a relationship between the radiation wave and the control signal of the initial unit 1. As can be seen from the figure, the work period of the initial unit 1 and the corresponding radiation wave repetition rate are determined by the control signal.

Figure 3:
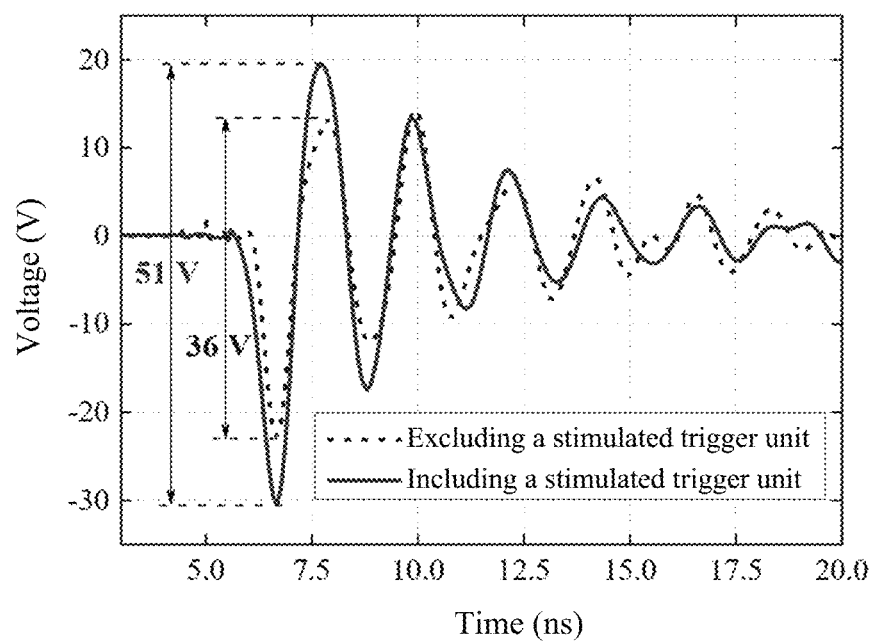
FIG. 3 is a schematic diagram of radiation waves of first-order (excluding an amplifying unit 2 which is stimulated to emit) and second-order (including the amplifying unit 2) self-oscillating active integrated antenna systems in an array arrangement direction in a particular example of the present disclosure.

FIG. 3 shows radiation waves of first-order (excluding the amplifying unit 2) and second-order (including the amplifying unit 2) self-oscillating active integrated antenna systems in an array arrangement direction. It can be seen from the figure that the main peak voltage of the radiation wave of the second-order system is 51 V, which is about $\sqrt{2}$ times the main peak voltage of 36 V of the radiation wave of the first-order system, and the power is almost twice thereof. The in-phase superposition of the radiation waves of the amplifying unit 2 and the initial unit 1 is realized, and the phase difference caused by the spatial distance is overcome. Therefore, the free scalable property of the output power can be achieved by increasing the number of the amplifying unit 2.

Figure 4:
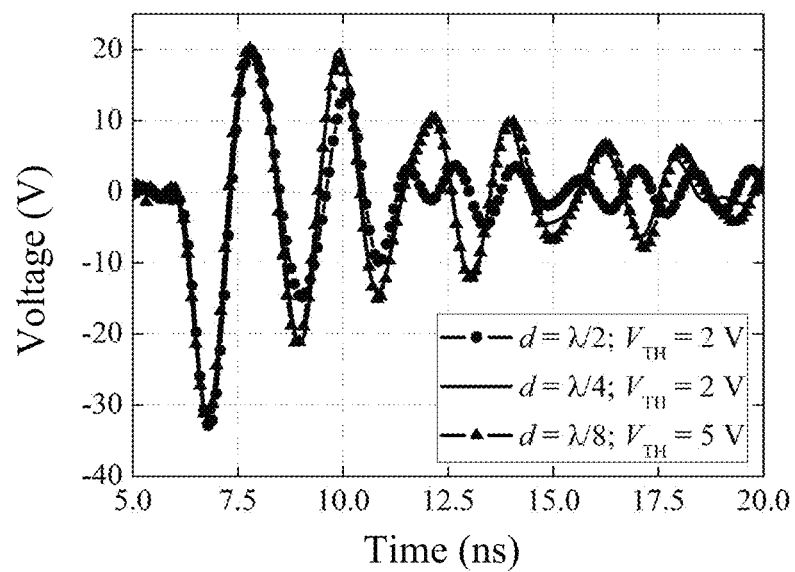
FIG. 4 shows output voltages of second-order self-oscillating active integrated antenna systems with different unit spacings in a particular example of the present disclosure.

FIG. 4 shows output voltages of systems with different unit spacings. A threshold voltage is defined as $V_{TH}=V_{BR2}-V_{DC2}$, where $V_{BR2}$ is the breakdown voltage of the second switching transistor 21. When the unit spacing d is decreased from λ/2 to λ/4 (λ being a wavelength), the coupling voltage is still less than $V_{TH}$, which is not enough to achieve 0 trigger of the unit 2 in advance, so the unit 2 is triggered by the radiation wave of the unit 1 to realize coherent stimulated emission, and the radiation waves are almost in-phase superimposed, and the output power is increased. When the unit spacing d is decreased to λ/8, the coupling voltage is enough to trigger unit 2 before the radiation wave of the unit 1 reaches the unit 2, which leads to a phase difference between the unit 2 and the unit 1, and the coherent stimulated emission mechanism fails. In order to solve the above problems, as shown in the figure, $V_{TH}$ can be increased to 5 V by reducing the bias voltage $V_{DC2}$ of the direct current voltage source, and in this case, the output voltage of the system is almost the same as that when the unit spacing is $\lambda/2$ and $\lambda/4$, that is, the self-oscillating active integrated antenna system proposed in this patent can overcome the influence of the coupling voltage by reducing the direct current bias voltage, thereby realizing a compact system structure.

The preferred examples of the present disclosure have been described in detail above, but the present disclosure is not limited to the examples, and those skilled in the art can also make various equivalent modifications or substitutions without departing from the spirit of the present disclosure, and all these equivalent modifications or substitutions fall within the scope defined by the claims of the present application.

What is claimed is:

1. A miniaturized self-oscillating active integrated antenna system, comprising:
    at least one antenna array unit, wherein the antenna array unit comprises an initial unit and multiple amplifying units which are stimulated to emit;
    the initial unit comprises a first dielectric substrate and a first surface structure, the first surface structure is connected to a surface of the first dielectric substrate, the first surface structure comprises a first boat-shaped monopole antenna, the first boat-shaped monopole antenna formed by
        a first switching transistor, a base bias network and a first direct current bias network, a collector of the first switching transistor is connected to a first radiating arm disposed at a center above a first ground plane, an emitter of the first switching transistor is connected to the first ground plane, a base of the first switching transistor is connected to the base bias network, and the first direct current bias network is connected to the first radiating arm;
    each of the amplifying units comprises a second dielectric substrate and a second surface structure, the second surface structure is connected to a surface of the second dielectric substrate, the second surface structure comprises a second boat-shaped monopole antenna, the second boat-shaped monopole antenna formed by
        a second switching transistor, a first resistor and a second direct current bias network, a collector of the second switching transistor is connected to a second radiating arm disposed at a center above a second ground plane, an emitter of the second switching transistor is connected to the second ground plane, a base of the second switching transistor is connected to the first resistor, a second terminal of the first resistor is connected to the second ground plane, and the second direct current bias network is connected to the second radiating arm;
    both the first ground plane and the second ground plane have symmetrical cut angles;
    wherein the self-oscillating active integrated antenna system overcomes influence of a coupling voltage by reducing a direct current bias voltage of the first direct current bias network and the second direct current bias network.

2. The miniaturized self-oscillating active integrated antenna system according to claim 1, wherein the base bias network comprises a second resistor, a first capacitor and a third resistor, a first terminal of the second resistor is connected to a first terminal of the first capacitor, a second terminal of the first capacitor and a first terminal of the third resistor are connected to the base of the first switching transistor, and a second terminal of the second resistor and a second terminal of the third resistor are connected to the first ground plane.

3. The miniaturized self-oscillating active integrated antenna system according to claim 2, wherein the first direct current bias network comprises a first direct current voltage source and a fourth resistor, the first direct current voltage source is connected to a first terminal of the fourth resistor, and a second terminal of the fourth resistor is connected to the first radiating arm.

4. The miniaturized self-oscillating active integrated antenna system according to claim 3, wherein the first switching transistor comprises an avalanche transistor, and the second switching transistor comprises an avalanche transistor.

5. The miniaturized self-oscillating active integrated antenna system according to claim 3, wherein
    the first switching transistor is used for receiving a control signal and control connection and disconnection of the first radiating arm and the first ground plane; and
    the first direct current bias network is used for charging the first boat-shaped monopole antenna when the collector and the emitter of the first switching transistor are disconnected.

6. The miniaturized self-oscillating active integrated antenna system according to claim 3, wherein a working process of the initial unit is as follows:
    in an initial state, the collector and the emitter of the first switching transistor are disconnected, the first boat-shaped monopole antenna is charged to a high voltage via the first direct current bias network, and the first switching transistor is biased to a critical breakdown state;
    when the control signal becomes high level and triggers the first switching transistor to connect the collector and the emitter via the base bias network, charges between the first radiating arm and the first ground plane oscillate at the resonate frequency of the antenna to form an oscillating current and radiate an electromagnetic wave to the outside;
    in a radiation process, a potential difference between the first radiating arm and the first ground plane is decreased gradually, and an output voltage shows an attenuation trend; and
    when the control signal becomes low level and enables the first switching transistor to disconnect the collector and the emitter, the first boat-shaped monopole antenna enters a charging state and waits for a next trigger by the control signal to enter a next work period.

7. The miniaturized self-oscillating active integrated antenna system according to claim 6, wherein the first direct current voltage source is increased to be greater than the breakdown voltage of the first switching transistor, such that periodic connection and disconnection of the first switching transistor are realized, the oscillating current is periodically generated, and the electromagnetic wave is emitted.

8. The miniaturized self-oscillating active integrated antenna system according to claim 3, wherein a working process of each of the amplifying units is as follows:

in an initial state, the collector and the emitter of the second switching transistor are disconnected, the second boat-shaped monopole antenna is charged to a high voltage via the second direct current bias network, and the second switching transistor is biased to a critical breakdown state;

the electromagnetic wave radiated by the initial unit is received, potential on the second radiating arm is increased, the second switching transistor is break down and is in a short circuit, and the second boat-shaped monopole antenna is triggered to generate an oscillating current and emit an electromagnetic wave with the same phase as the incident wave; and in-phase superposition of the two radiation waves is realized, such that coherent stimulated emission is realized, and the radiation waves are continued to be radiated to a latter amplifying unit.

* * * * *